UNITED STATES PATENT OFFICE.

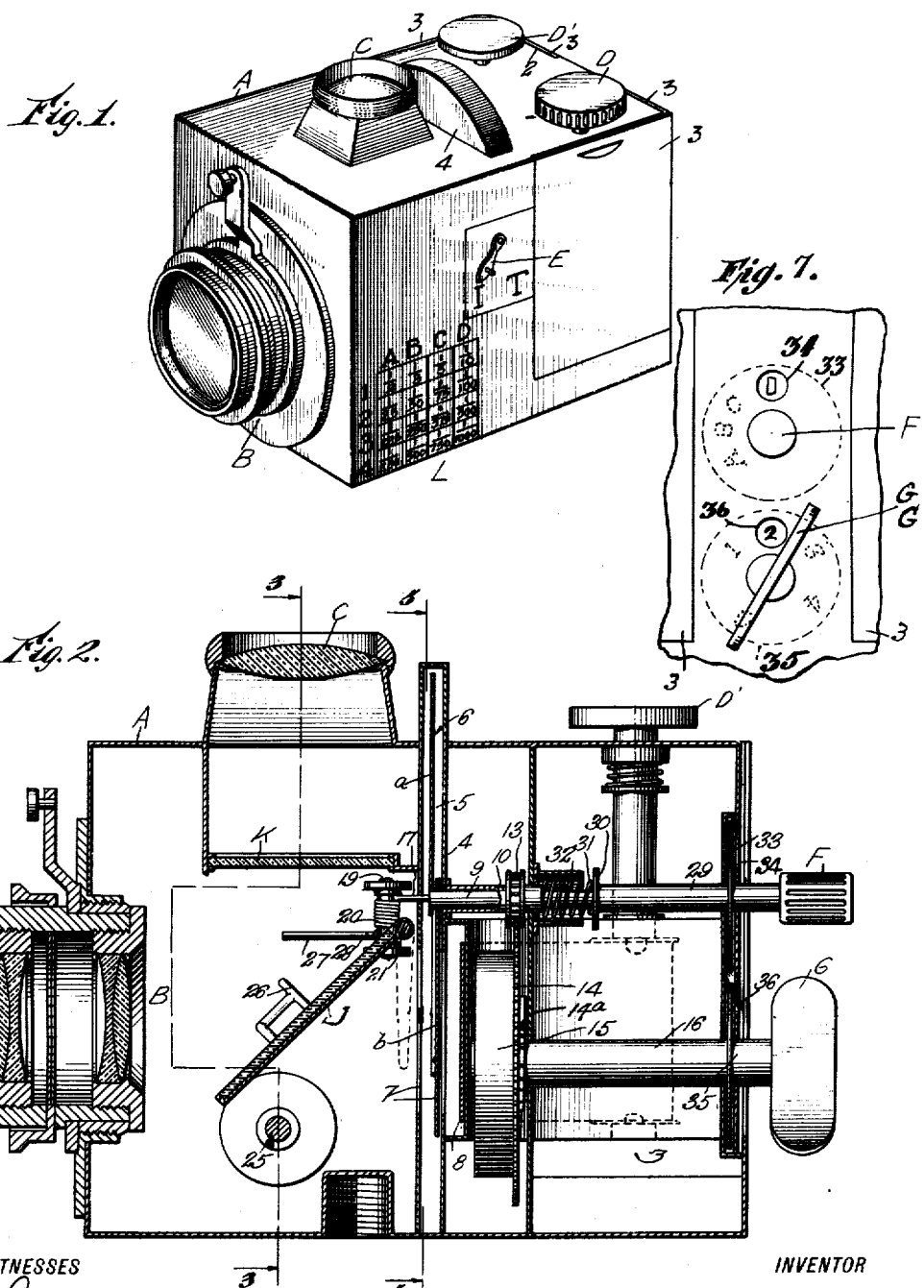

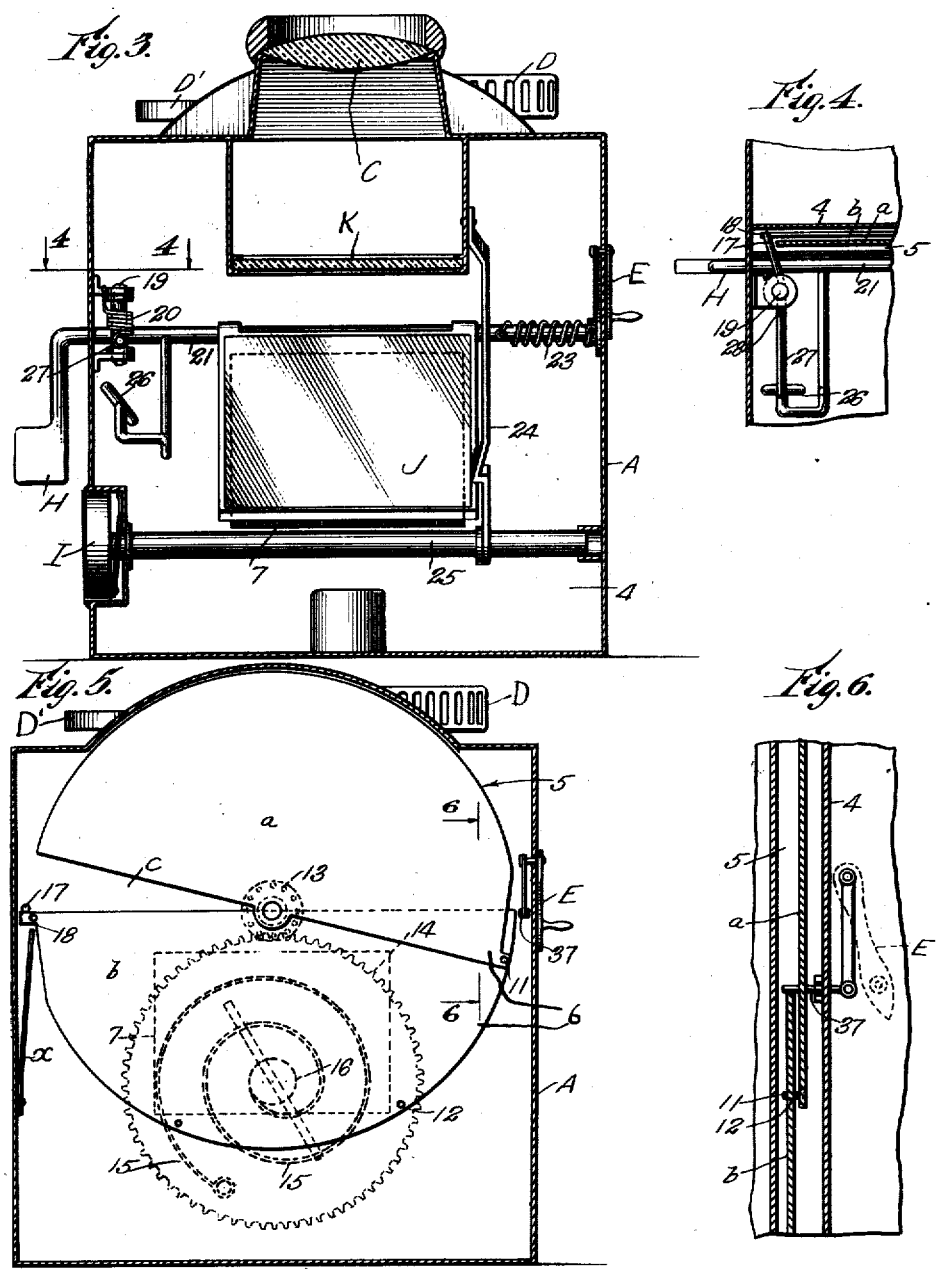

MALCOLM BOYD BOYCE, OF HAVERHILL, MASSACHUSETTS.

REFLEX FOCAL-PLANE CAMERA.

1,348,778.   Specification of Letters Patent.   Patented Aug. 3, 1920.

Application filed July 8, 1918. Serial No. 243,830.

*To all whom it may concern:*

Be it known that I, MALCOLM B. BOYCE, a citizen of the United States, and a resident of Haverhill, in the county of Essex and State of Massachusetts, have invented a new and Improved Reflex Focal-Plane Camera, of which the following is a full, clear, and exact description.

This invention relates to cameras of the automatic reflex focal plane type and has for its general objects to improve the construction and operation of devices of this character so as to be reliable and efficient in use, easily manipulated, and of simple and compact construction.

A more specific object of the invention is the provision of a camera having a moving picture lens and a novelly adjusted moving picture shutter in combination with means for releasing the shutter, which latter is motor-driven by a spring, the tension of which can be adjusted as desired.

The camera is designed for a small film, such as a moving picture film, and the lens is of such a character that sharp negatives can be made which will permit of enlargements with highly satisfactory results.

For a more complete understanding of the invention reference is to be had to the following description and claims taken in connection with the accompanying drawings, which illustrate one embodiment of the invention and wherein similar characters of reference indicate corresponding parts in all the views, in which—

Figure 1 is a perspective view of the camera;

Fig. 2 is a vertical sectional view taken through the center of the lens;

Fig. 3 is a transverse section on the line 3—3, Fig. 2;

Fig. 4 is a detail view of the mirror released shutter stop;

Fig. 5 is a sectional view on the line 5—5, Fig. 2, showing the adjustable shutter;

Fig. 6 is an enlarged detail sectional view on the line 6—6, Fig. 5; and

Fig. 7 is a view of a portion of the rear of the casing.

Referring to the drawing, A designates the casing, which is of any suitable construction and has a moving picture or other lens B at its front, a focusing lens C at the top, film mechanism knobs D and D' also at the top, an exposure regulating lever E at the side, a shutter adjusting knob F, a motor winding key G at the rear, and a mirror re-setting lever H and a mirror releasing push button I at the side of the camera opposite from the exposure regulating lever E. The casing A has openings at its rear corners which are closed by L-shaped sliding doors or covers 3, whereby access is permitted to interior of the casing.

Extending across the casing adjacent the middle thereof is a chambered partition 4, in the chamber 5 of which is a rotary shutter 6 of the moving picture type, except that the shutter is made in sections $a$ and $b$ relatively adjustable to vary the exposure opening $c$ of the shutter. The walls of the partition 4 have openings 7 in line with the picture-taking lens B, so as to expose the film 8 when the opening of the shutter passes the openings 7 of the partition. The sections $a$ and $b$ of the shutter are attached respectively to the concentric solid and tubular shafts 9 and 10, so that one section can be turned with respect to the other on a common axis to vary the segmental exposure opening $c$. The gap or opening $c$ can be varied from the angle shown in Fig. 5 to approximately one hundred and eighty degrees, there being a pin 11 on the upper section $a$ adapted to engage in any one of a number of spaced apertures 12 at the periphery of the section $b$, whereby the two sections are held together for rotation as a unit. On the tubular shaft 10 is a gear 13 which meshes with a gear 14 loose on the winding shaft 16 and connected therewith by the pawl and ratchet 14ª. A spiral spring 15 has one end secured to the casing and the other end to the winding shaft, so that it constitutes a motor for rotating the shutter. The shutter makes one revolution for each exposure and at the end of a revolution the shutter is arrested by a stop 17 so arranged as to engage the lug 18 on the section $b$ of the shutter. When the stop 17 is released, as when exposure is to be made, the shutter turns under the tension of the spring 15, and when the revolution is completed the stop 17 will arrest the shutter so as to be ready for the next exposure. The stop 17 is in the form of a finger carried by a shaft 19 which is acted on by a spring 20 to yieldingly retain the stop in shutter-holding position and to return the stop to such position after it has been moved to releasing position. The shaft 19 is rocked by means of the reflecting mirror J, which is positioned in the casing A at a point behind the picture-taking lens B, so that when the mirror is moved out of its normal position when snapping the camera, the stop 17 will be automatically released to permit the shutter to turn. The mirror J is mounted on a horizontal shaft 21 which extends out of the casing at one end and carries a re-setting lever H, and on the shaft is a helical spring 23 which tends to throw the mirror upwardly. A catch 24 is arranged to engage one edge of the mirror to hold the same downward, or in set position against the tension of the spring 23, and as soon as this catch is released the mirror flies upwardly. The releasing of the catch is effected by the lower end of the catch being fastened to the stem 25 of the pushbutton I, Fig. 3, so that by pressing the button inwardly or to the right the catch 24 is released from the mirror J. On the shaft 21 carrying the mirror is a striking member or arm 26 which engages a finger 27 on the stop shaft 19, so that as the mirror swings upwardly the member 26 will strike, move and pass the finger 27 and release the shutter stop. The mirror after having been released will remain in raised position and is lowered or re-set only by moving the lever downwardly, but the shutter stop 17 automatically returns to holding position without the member 26 interfering, because the finger 27 has a knuckle joint 28 which allows the finger 27 to pass the member 26 as the mirror lowers. Normally the mirror is set at forty-five degrees to the focal axis of the lens B and forty-five degrees to the ground glass K, which latter is located above the mirror and under the focusing lens C.

The knob F is employed for adjusting the opening of the shutter. This knob is fastened to an extension 29 of the shaft 9, and on this extension is a disk 30 against which bears a spring 31 surrounding the shaft 9. This spring 31 exerts a pressure on the shaft 9 in a direction to maintain the pin 11 on the shutter section a in any one of the openings 12. Adjacent the disk 30 is an abutment 32 with which the disk engages when the knob F is pressed inwardly so as to limit the motion which disengages the pin 11 from an opening 12. While the knob is thus pressed inwardly with the disk 30 against the abutment 32, the knob F is turned so as to shift the shutter section a to any desired extent. The shutter is prevented from revolving backward while adjusting the section a by means of a leaf spring x on the casing and engaging the section b of the shutter. To guide this adjustment of the shutter opening an indicating wheel 33 is arranged on the shaft extension 29, and in the rear wall of the casing is an opening 34 through which the wheel or dial 33 is exposed. On this dial are letters A, B, C and D, as shown in Fig. 7, to represent different positions of opening, the letter D corresponding to the smallest opening and the letter A the largest opening. After the adjustment is effected the pressure on the knob F is released, which allows the shaft 9 to move to the right, Fig. 2, and engage the pin 11 in the adjacent opening 12 of the shutter section b. It is to be understood that for time exposure the shutter sections must first be adjusted to maximum opening. Associated with the spring winding key G is an indicator or dial 35 which has numbers thereon to determine the tension of the spring, it being understood that the tension of the spring can be varied for variations in the rapidity of exposures. The back of the casing has an opening 36 through which a number on the dial 35 is exposed. On the side of the casing, as shown in Fig. 1, is a chart L having columns headed at the top by the letters corresponding to the letters of the dial 33, and the horizontal rows of the chart are numbered with numerals corresponding with the numbers on the dial 35, and in the squares of the chart are fractions of a second, so that by using any combination of letter and number and adjusting the dials accordingly an exposure from a half to one thousandth of a second may be obtained.

In order to obtain instantaneous or time exposures the timing mechanism E is employed. This mechanism comprises a lever with which is associated the letters I and T, representing instantaneous and time exposures. The lever which is at the outside of the casing is connected with a pin or brake member 37 which, when the lever E is at the letter T, will engage the shutter when the latter has moved far enough to move the opening thereof into exposing position. After the desired length of exposure has been obtained the lever is moved to position I, which causes the shutter to be released so that it will continue its movement to initial position and cut off the light from the film.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A camera including a shutter having relatively rotatable and axially movable sections, a device for rotating and axially moving the sections relatively one to the other, coöperating locking means on the sections and controlled by the axial movement thereof, and a motor for turning the sections.

2. In a camera, a rotatable shutter formed of two sections, one of which is rotatable and axially movable with respect to the other, interengaging locking means on the sections and normally held in engagement, means for operating the rotating and axially movable section, and means for operating the shutter.

3. In a camera, a rotatable shutter composed of a pair of sections, concentric shafts connected with the respective sections, one section having a locking pin and the other section having a plurality of openings to engage the pin when the sections are in different positions, spring means acting on the shafts to hold the pin interlocked in any opening, and means for relatively moving the shafts to unlock the sections and relatively turn the same.

4. In a camera, the combination of a shutter formed of two semi-circular sections rotatable relatively one to the other to adjust the opening between them, an indicator for determining the adjustment of the opening, an adjustable motor for operating the shutter, and an indicator for facilitating the adjustment of the motor.

5. In a camera, a revoluble shutter formed of two sections, interengaging means on the sections for adjustably locking them together, concentric shafts to which the shutter sections are secured, one of the shafts being movable endwise, spring means acting on the shafts to hold the locking means of the sections in engagement, a motor, and means for operating one of the shafts from the motor.

6. In a camera, a shutter formed of two sections, interengaging means on the sections for adjustably locking them together, concentric shafts to which the shutter sections are secured, one of the shafts being movable endwise and provided at its end with a knob, spring means acting on the shafts to hold the locking means of the sections in engagement, a motor, and gearing for operating one of the shafts from the motor.

7. In a camera, a rotatable shutter formed of two semi-circular sections, one of which is movable axially and rotatable with respect to the means for adjustably locking the sections together, means for operating the axially movable sections to release the locking means, spring actuated means for rotating the shutter, a spring actuated stop for engaging one section of the shutter to arrest the shutter, and means for disengaging the stop from the shutter section to permit the shutter to be turned by the operating means.

8. In a camera, a shutter formed of two semi-circular sections, means for adjustably locking the sections, spring actuated means for rotating the shutter, a spring actuated shaft provided with a stop for engaging one shutter section to arrest the shutter, and means for operating the shaft to release the stop from the shutter section and thereby permit the shutter to be again rotated.

MALCOLM BOYD BOYCE.